United States Patent [19]

Diekhoff et al.

[11] Patent Number: 5,526,662
[45] Date of Patent: Jun. 18, 1996

[54] CASHLESS KEY AND RECEPTACLE SYSTEM

[75] Inventors: Robert R. Diekhoff; Joseph H. Sutton, both of Harrison, Ak.; Hazem Hassan, Burnsville; Michael Boehner, Minnetonka, both of Minn.

[73] Assignees: Duncan Industries Parking Control Systems Corp., Harrison, Ark.; Datakey, Inc., Burnsville, Minn.

[21] Appl. No.: 174,873

[22] Filed: Dec. 28, 1993

[51] Int. Cl.$^6$ ........................................ E05B 49/00
[52] U.S. Cl. ........................ 70/278; 70/277; 70/409; 70/413; 235/443; 235/492; 340/825.31
[58] Field of Search .................... 70/277, 278, 454, 70/403, 407, 409, DIG. 30; 194/900, 210; 235/384, 443, 492; 340/825.31

[56] References Cited

U.S. PATENT DOCUMENTS

| | | | |
|---|---|---|---|
| 3,001,167 | 9/1961 | Chesnutt et al. | 339/89 |
| 4,297,569 | 10/1981 | Flies | 235/443 |
| 4,326,125 | 4/1982 | Flies | 235/443 |
| 4,379,966 | 4/1983 | Flies | 235/443 |
| 4,420,794 | 12/1983 | Anderson | 70/DIG. 46 |
| 4,522,456 | 6/1985 | Wehrmacher | 339/17 R |
| 4,549,076 | 10/1985 | Flies | 235/382 |
| 4,578,573 | 3/1986 | Flies et al. | 235/492 |
| 4,620,088 | 10/1986 | Flies | 235/443 |
| 4,752,679 | 6/1988 | Wehrmacher | 235/443 X |
| 4,924,686 | 5/1990 | Vonlanthen | 70/277 |
| 4,947,662 | 8/1990 | Imedio | 70/277 X |
| 5,186,031 | 2/1993 | Janssen et al. | 70/277 |
| 5,195,341 | 3/1993 | Nieuwkoop | 70/278 |
| B1 5,109,972 | 6/1993 | Van Horn et al. | 194/217 |

FOREIGN PATENT DOCUMENTS 266075  10/1990  Japan ................... 70/DIG. 30

*Primary Examiner*—Steven N. Meyers
*Assistant Examiner*—Suzanne L. Dino
*Attorney, Agent, or Firm*—Rockey, Rifkin & Ryther

[57] ABSTRACT

A combination key-like device and electrical receptacle for the key-like device wherein the receptacle defines electrical contact surface areas for mating with corresponding contact surface areas defined by the key-like device. At least one clip defines the electrical contact surface areas for the said receptacle and the clip is supported on the receptacle body. A keyway opening is defined by the body and the clip comprises a transverse portion and a pair of legs extending outwardly from the transverse portion with contact elements defined by each of the legs extending inwardly toward the keyway opening and with openings defined by the body communicating with said keyway opening for receiving the contact elements. A contact band is carried by the key-like device whereby insertion of the key-like device into the keyway opening brings the contact band into electrical contact with at least one of the contact elements.

31 Claims, 5 Drawing Sheets

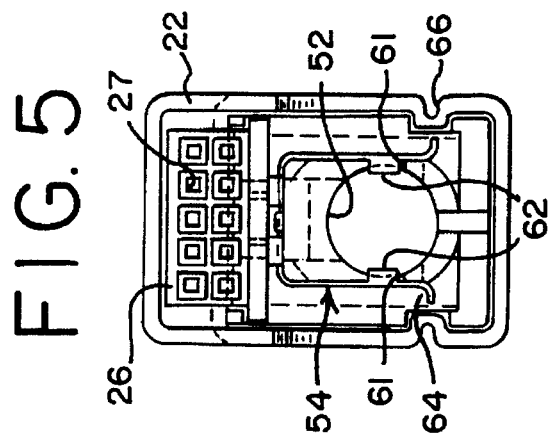
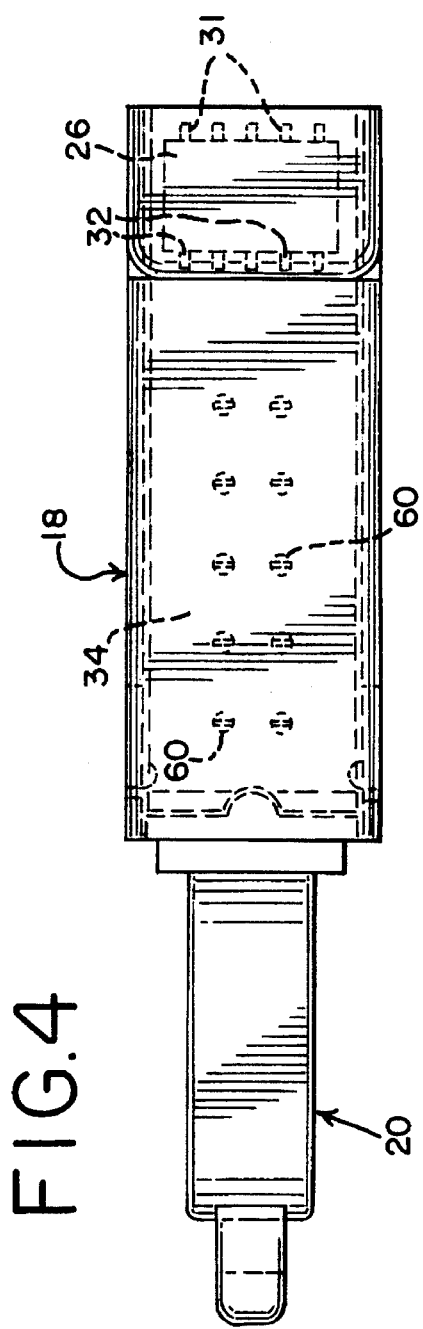
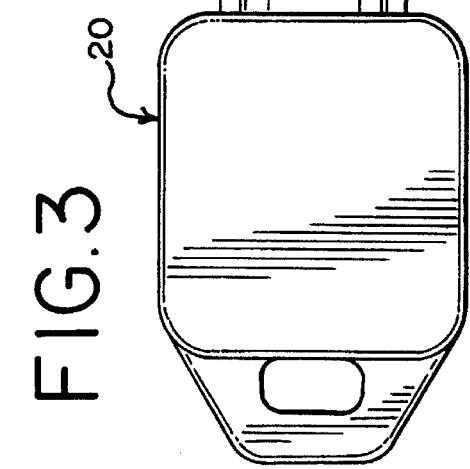

CASHLESS KEY AND RECEPTACLE SYSTEM

BACKGROUND OF THE INVENTION

This invention relates to a system suitable for use as an information transfer means in conjunction with products such as vending machines, vehicles or a variety of other products wherein, for example, key-like devices are employed in conjunction with receptacles in the products for receiving such a device. Each of the key-like devices and the receptacle have associated electrical components, and the system involves the developing of electrical contact between respective contact areas of the device and the receptacle. When such contact is established, an information transfer function, such as a vending function is then achievable.

To further illustrate the various forms which the invention may take, it is noted that the invention contemplates use of the system for transferring and storing data (including monetary value), for the vending of products and services, for access control for secure areas, for computers and other equipment, and as a rugged replacement; for ISO standard or other smart cards. It is contemplated, for example, that the electrical receptacle for the key-like device will be associated with machines used for dispensing products and services which ordinarily are limited to the receipt of cash in order for the dispensing operation to take place. The holder of a key-like device of the type contemplated by this invention will be able to use that device in lieu of cash. Thus, the holder will have obtained credit up to a certain amount and this credit amount is stored in the memory of the key-like device. Electrical systems of the invention are programmed in a manner such that when the device is used, for example, in a vending machine and a product is dispensed, the memory of the device will record a debit in accordance with the cost of the dispensed product.

Through the use of printed circuit board technology, accompanied by appropriate software and programming, both the key-like device and the equipment with which the receptacle is associated can be made to record any transaction in memory. Thus, for example, the system may be utilized under conditions where the key-like device is "purchased" for an amount such as $100.00, and the device can then be used in combination with a vending operation until the amount of credit purchased has been exhausted.

As indicated, in addition to the vending of products, the system of the invention is suitable for use in a variety of applications including the vending of services. Such services may include, for example, the use of a coin operated washing machine or the purchase of time on a parking meter. The following more detailed description of the invention will illustrate use of the system in connection with a parking meter; however, it will be readily understood that the features to be described are readily applicable to many other operations including, for example, in a vehicle ignition system, or for other applications where security can be enhanced by requiring the electronic transfer of information before some other operation is possible. The key-like device could, for example, be used for security to gain access through a door or to a computer system.

Various prior art systems have been developed which involve the use of a key-like device in combination with a receptacle, with the respective components of the system including printed circuit boards for achieving use of the system in connection with operations including vending operations. Reference is made in particular to U.S. Pat. Nos. 4,549,076; 4,578,573 and 4,620,088.

As discussed in these patent disclosures, electrical key-like devices have been proposed in which a master circuit or electrical operating system of some kind, such as a computer system, is activated by use of a portable key-like device which is combined with the electrical system, as by insertion into a receptacle, to make electrical contact or connection with the system. This invention is specifically concerned with a receptacle for receiving the electrical key-like devices and providing electrical connection between the device and a computer or other master circuit operating system.

The key-like devices of the aforementioned patents retain relatively large amounts of data bits (information) in a portable medium of small size. Very fast data access and data transfer rates are provided by electric connection of such devices to a master electrical circuit means including a program memory and a processor by insertion of the key-like device into specially designed electrical receptacles. It is an object of this invention that the receptacles and key-like devices have a design which provides good electrical contact with the computer, even after prolonged usage which might be out of doors, and to fulfill this and other objectives which will be described.

BRIEF SUMMARY OF THE INVENTION

This invention specifically involves improvements in the particular means employed in the key-like device and associated electrical receptacle for achieving the system operation. In the preferred form of this invention, the electrical contact surface areas of the receptacle are provided by means of at least one clip supported on the receptacle body. A keyway opening is defined by the receptacle body for receipt of the key-like device. The clip defines contact elements which extend inwardly of the receptacle body through openings in the body whereby the contact elements are exposed within the keyway opening. An exterior housing for the receptacle body preferably engages the clip to ensure proper positioning within the receptacle body interior.

The key-like device includes at least one contact band which, upon insertion of the device into the key-way opening will provide engagement of the band with at least one of the contact elements. The key-like device is preferably circular in cross section, and each band associated with a device preferably extends completely around the circumference of the device so that engagement of the contact element with a band can be achieved in any angular position of the key-like device within the keyway opening.

Where a printed circuit board is used in combination with the key-like device, conductive areas are provided at edges of the board, and at least one contact band is assembled in a fashion such that it will engage the conductive areas. Preferably, the conductive areas are connected to the same portion of the electrical circuit of the printed circuit board so that any electrical contact between a contact band and a contact element of the receptacle will be sufficient for achieving the intended functions of the electrical circuit. In other words, redundancy may be provided to avoid problems which might otherwise be encountered if one of the conductive areas of the PC board were not in good electrical contact with a contact band and/or if one of the contact elements of the receptacle were not in good electrical contact with a contact band.

BRIEF DESCRIPTION OF THE DRAWINGS

FIG. 3 is a side elevational view of a receptacle with inserted key-like device of the type contemplated by this invention;

FIG. 4 is a top plan view of the combination of FIG. 3;

FIG. 5 is an end elevation of the combination of FIG. 3;

DETAILED DESCRIPTION OF THE INVENTION

Figure 1:
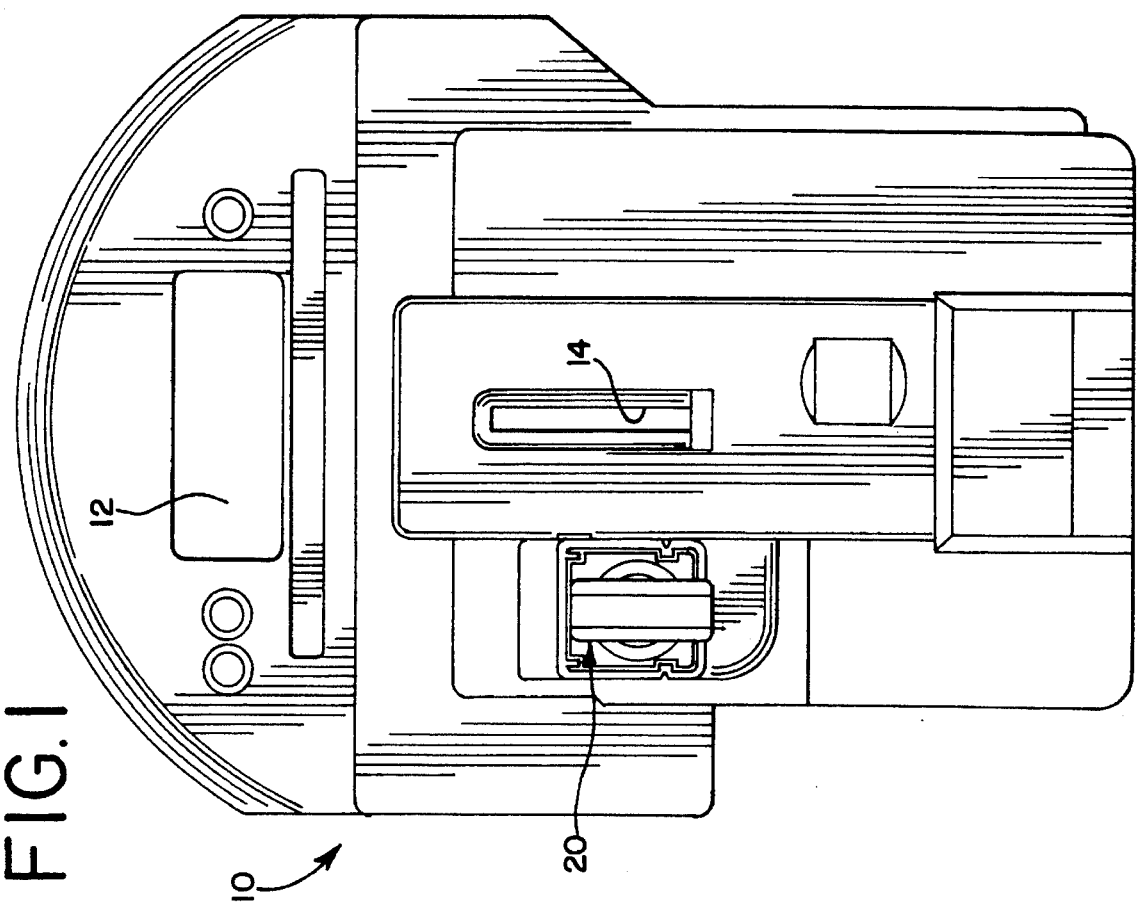
FIG. 1 is a vertical elevational view of a parking meter adapted for use in connection with the system of this invention.

FIG. 1 illustrates a mechanism 10 which is adapted for insertion within the upper housing of a parking meter. This mechanism may be generally of the type illustrated in U.S. Pat. No. 5,109,972 wherein a display window 12 provides means for digitally displaying unexpired time. A coin slot 14 is provided whereby the meter is also usable by a motorist wishing to employ cash for purchasing parking time.

The mechanism defines front wall portion 16 and a receptacle 18 is positioned behind this front wall. A key-like device 20 is received within the receptacle 18. It will be appreciated that this device is removable whereby the mechanism may be operated by a number of motorists having such devices.

Figure 2:
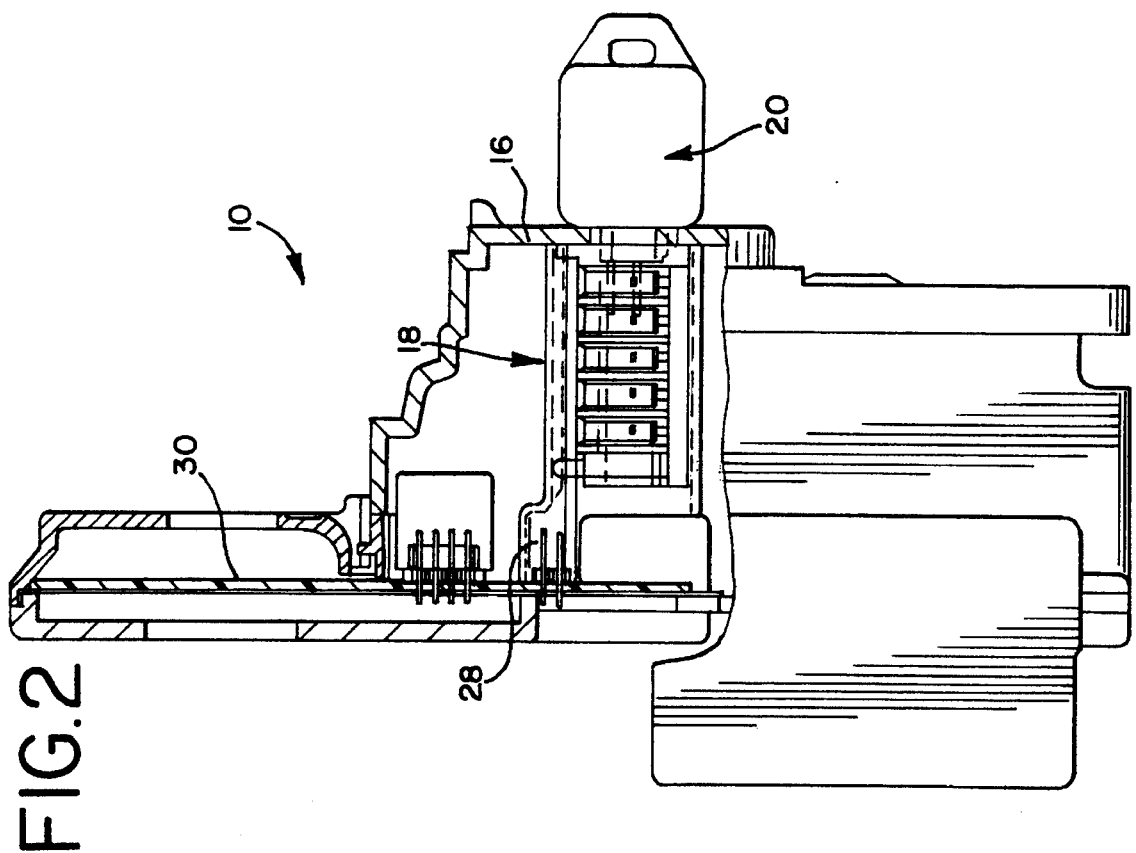
FIG. 2 is a side elevational view, partly cut away, of the parking meter shown in FIG. 1.

FIGS. 3, 4 and 5 illustrate the combination of the receptacle 18 and device 20 in greater detail. Thus, receptacle 18 includes an outer housing portion 22 which includes end section 24 for receiving element 26. The element 26 defines a plurality of openings 27 which receive pins 28 carried by printed circuit board 30 supported within the mechanism as shown in FIG. 2. Contacts 31 and 32 are soldered to PCB 34 which is heat staked to button 40 and protrusion 46 (FIGS. 6 and 7).

The PCB 30 will generally include a microprocessor and will be programmed to permit use with the system of the invention. It will be noted that the receptacle 18 including its outer housing 22 comprises a module which can simply be plugged into PCB 30 of the meter mechanism 10. Accordingly, meters or other products can be readily used with or without the module which provides the advantage of versatility from a sales and marketing standpoint.

Figure 8:
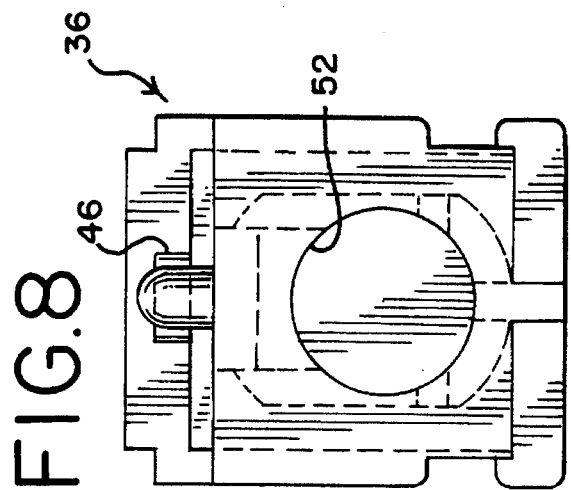
FIG. 8 is an end elevational view of the receptacle portion.
Figure 7:
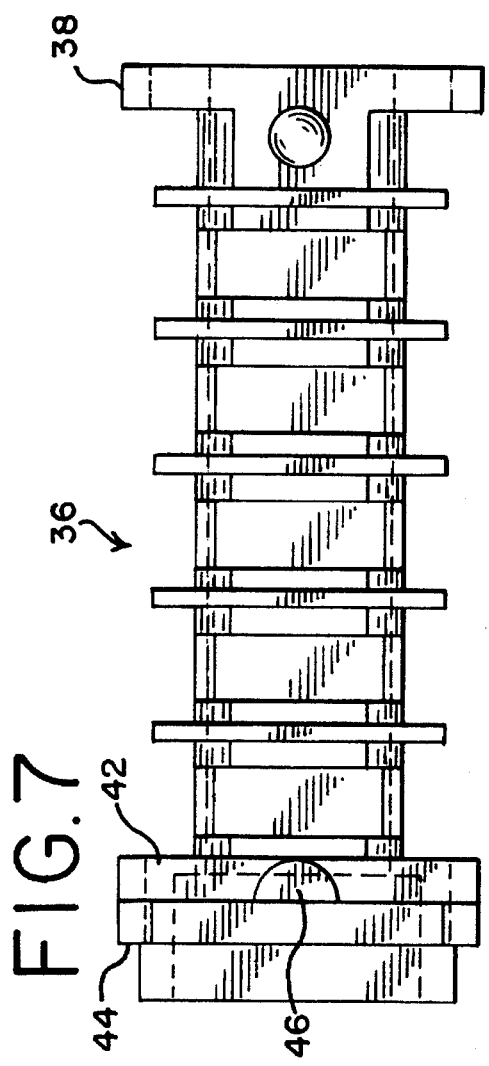
FIG. 7 is a top plan view of the receptacle portion of FIG. 6.
Figure 6:
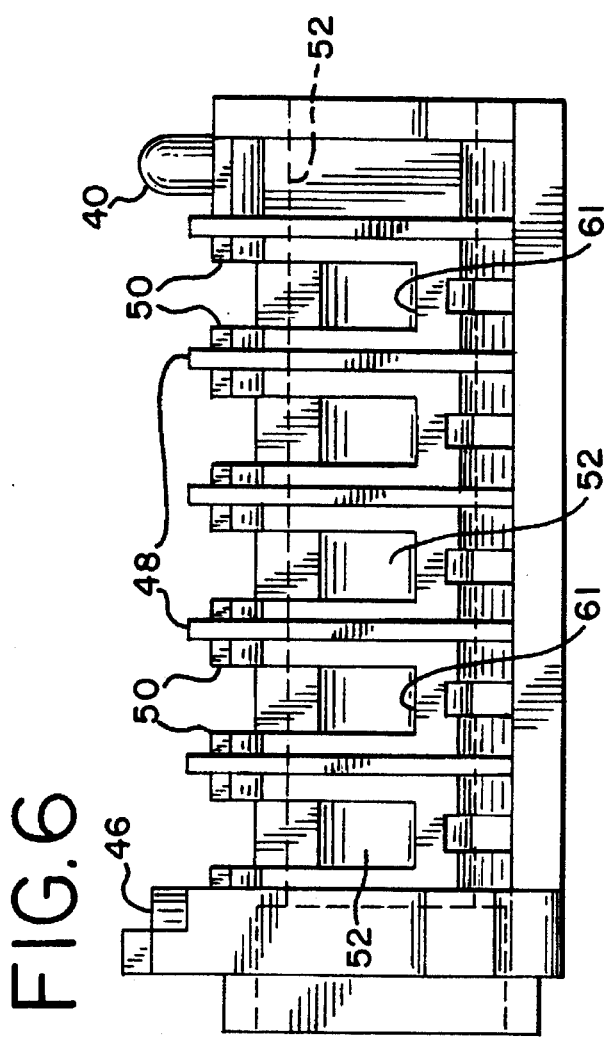
FIG. 6 is a side elevation of the receptacle portion of the system with the outer housing removed.

FIGS. 6, 7 and 8 illustrate the details of the interior of the receptacle 18. Specifically, a molded plastic component 36 formed, for example, using "Nylon 6/6PTE" manufactured by LNP, is situated within outer housing portion 22 which may be formed of Delrin manufactured by E.I. DuPont. This component includes end wall 38 with a button 40 extending upwardly therefrom for receipt within an opening defined by PCB 34. The opposite end of PCB 34 is supported by shoulder 42 defined by end wall 44. A cutout at this end of the PCB receives the semi-circular protrusion 46 for holding the PCB in proper alignment.

The PCB 34 extends over ends defined by the top edges of a plurality of partition walls 48 defined by the component 36. A plurality of saddle areas 50 are defined between the respective walls. Circular keyway opening 52 extends completely through the component 36 for receipt of the cylindrical barrel 21 of key-like device 20 as will be explained in greater detail. The opening 52 is preferably of small size, in the order of 3/8 inch diameter or less, to minimize the possibility of entry of foreign objects.

Figure 9:
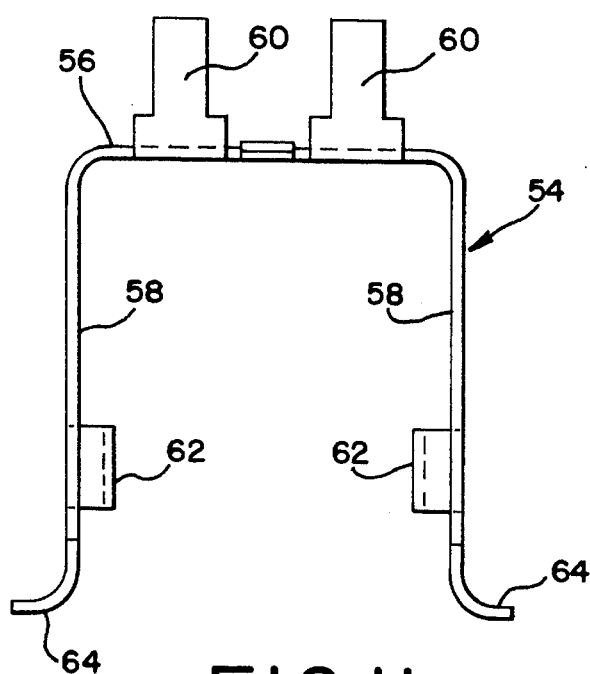
FIG. 9 is an elevational view of a clip with contact elements of the type contemplated for use in combination with the receptacle.
Figure 10:
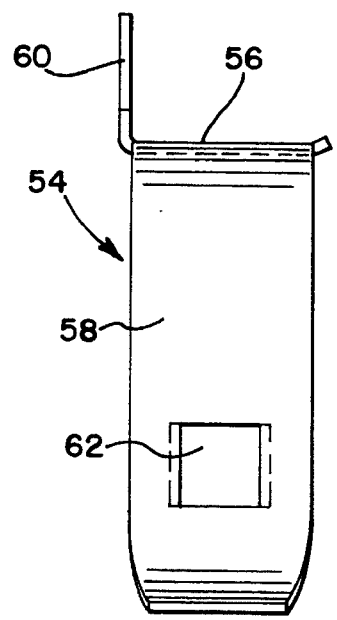
FIG. 10 is a side elevational view of the clip.

FIGS. 9 and 10 illustrate a clip structure 54 for use in association with the molded component 36 of the receptacle 18. The clip structure includes a horizontal top section 56 and downwardly depending legs 58. As illustrated, for example in FIG. 5, this arrangement permits location of a clip in each of the saddle areas 50 defined by the receptacle component 36. The top portion 54 includes upwardly extending tabs or ears 60 which are adapted for receipt in PCB 34 as shown, for example, in FIG. 4.

The downwardly depending legs 58 of the clip structure 54 each carry an inturned portion or dimple 62 which serves as a contact element. It will be noted in particular, for example as shown in FIGS. 5 and 6, that the component 36 defines side openings 61 communicating with the keyway opening 52 so that contact elements 62 extend inwardly relative to the opening 52 of the component 36. As will be explained in greater detail, this permits engagement between the contact elements 62 and contacts carried by the key-like device 20 as will be described.

The clip structure 54, in addition to being formed of a conductive material, is preferably resilient for thereby retaining the shape illustrated in FIG. 9. Accordingly, when the clip structure is assembled over a saddle area 50, the contact elements 62 will snap inwardly for thereby retaining the clip structure in assembly which simplifies subsequent handling as the assembly operation is continued. In this same regard, it will be noted that when the outer housing 22 is positioned around the receptacle component 36, a housing area is located immediately adjacent out-turned ends 64 of the contact element. Specifically, and as shown in FIG. 5, the outer housing includes inwardly formed longitudinally extending areas 66 which are positioned opposite out-turned ends 64, and this arrangement insures that the contact elements 62 do not move out of a position within the opening 52 to the extent that engagement with the key-like device would become less efficient.

FIGS. 12 through 16 illustrate the preferred form of a key-like device 20 for use in association with receptacle 18. This device includes an enlarged end portion 70 for handling by the user during insertion and removal of a key. The elongated barrel portion 21 extends outwardly from the enlarged end portion.

The key-like device 20 is preferably molded from a non-conductive plastic such as ABS resin manufactured under the tradename Cycolac by G.E. Plastics. The main body portion is molded around a PCB 74 shown in FIGS. 14 and 16. As indicated, the PCB with necessary electronic components has an enlarged end 76 corresponding in shape to the enlarged end 70 along with an elongated section 78 dimensioned to approximate the length of key-like device barrel portion 21. The PCB may be manufactured in conventional fashion wherein conductive material is initially applied to the board and then etched away using masking techniques to provide the desired pattern. In accordance with this invention, the masking is such that a plurality of conductive areas 80 are provided along the opposite edges of the PCB 74.

Figure 11:
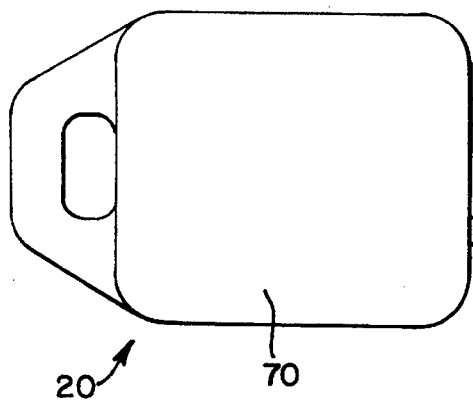
FIG. 11 is a plan view of a key-like device of the type contemplated by the invention.
Figure 13:
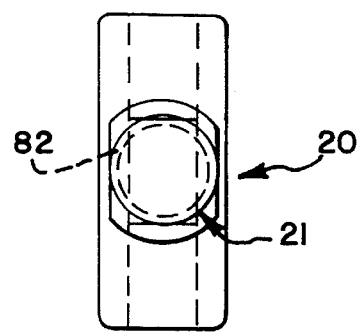
FIG. 13 is an end view of the key-like device.
Figure 12:
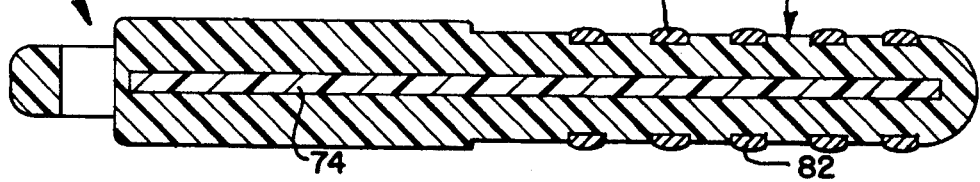
FIG. 12 is a longitudinal cross sectional view of the key-like device.
Figure 14:
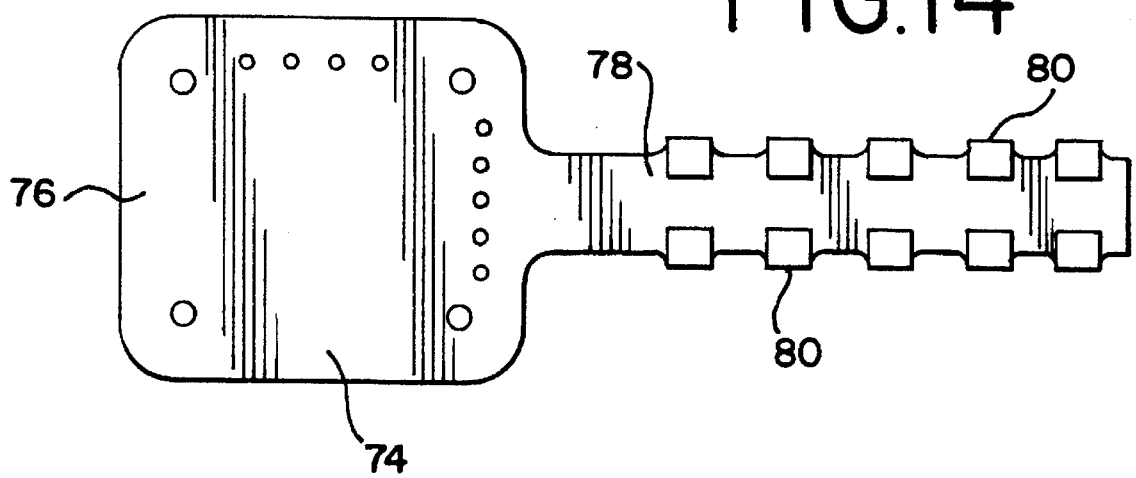
FIG. 14 is a top plan view of a printed circuit board adapted for use in combination with the key-like device.
Figure 16:
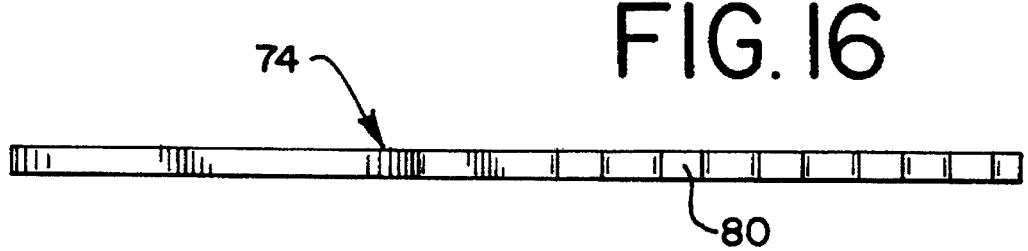
FIG. 16 is a side elevational view of the printed circuit board.
Figure 15:
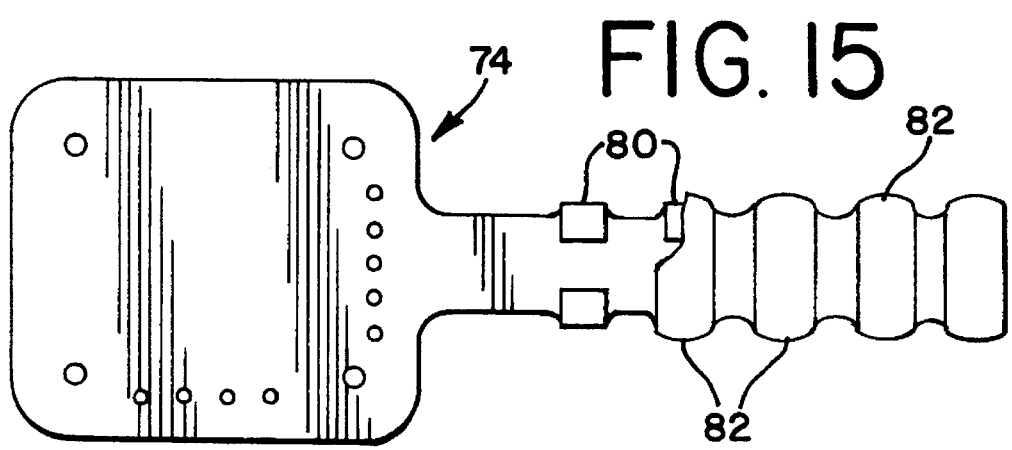
FIG. 15 is a bottom plan view of the printed circuit board of FIG. 14.

In the production of the key-like device 20, the PCB in the form shown in FIGS. 14 and 16 first has a plurality of circular conductive bands 82 soldered to it in the fashion shown in FIG. 15. Thus, each band is positioned, preferably by soldering, in conductive engagement with each pair of conductive areas 80. Thereafter, the PCB with its electronic components and associated bands 82 is located in a mold and, upon completion of the molding operation, as shown in FIGS. 11–13, the outer surfaces of the conductive bands 82 are exposed on the exterior of the barrel portion 21. Preferably, the diameters of the bands slightly exceed the barrel diameter to better insure electrical contact.

The location of the conductive bands on the barrel portion 21 of the key-like device is such that upon insertion in the receptacle opening 52, the conductive bands will be moved into engagement with contact elements 62. In this fashion, the PCB 74 of the key-like device 20 is brought into communication with PCB 34 of the receptacle 18 which, in turn, is plugged into the PCB 30 of the meter mechanism 10.

It will be apparent that the arrangement described provides a highly efficient means for achieving communication between a key-like device and the software of an apparatus for information transfer, such as for vending products or services as illustrated by the parking meter mechanism 10. Thus, the key-like device 20 can be programmed for the storage of a variety of data including, for example, an identifying code which will establish that the key-like device is appropriate for use in connection with a particular parking meter or other apparatus. Another item in the memory of the key-like device may involve the amount of credit remaining available. In this regard, it will be noted that five conductive bands are supported on the key-like device, and the same number of pairs of contact elements are provided in the receptacle. The contact between a particular band and a particular pair of contact elements can thus serve one specific purpose in the communication while the other bands and contact elements will serve other communication purposes. Obviously, the number of the bands and pairs of contact elements may vary depending on a particular application.

The use of the circular bands and pairs of contact elements, combined with the cylindrical shape of the barrel portion 21 provides for a high degree of reliability in the use of the described system. Thus, an individual using the key-like device may realize upon insertion that proper contact has not been made, perhaps due to contamination of one or more areas within the receptacle or on the key-like device. By twisting the key-like device, it is virtually assured that proper contact will eventually be made since a high degree of redundancy is automatically achieved. In that regard, the respective PCB's of the key-like device and receptacle may be designed so that the contact elements 62 and bands 82 communicate with the same circuit elements so that the same function is achieved even if only one of the contact elements of a pair is in conductive engagement with the band adjacent that pair.

In the case of a parking meter or in other applications, the system of the invention may be used out of doors which could lead to the collection of water within the receptacle 18. The particular structure illustrated, including the provision of the walls 48 which separate the saddle areas 50, minimizes any possibility of shorting between the clips 54. As described in the aforementioned U.S. Pat. No. 4,620,088, it is also preferred to provide openings in the bottom wall of the receptacle to permit drainage.

The key-like device structure of the invention is particularly suitable for reuse since it can be just as readily inserted into a receptacle of a computerized system intended for re-programming, addition of credit, etc. It is also feasible, however, to simply provide for throw-away of the device when the credit has been exhausted since expensive manufacturing costs are not involved.

It will be appreciated that various changes and modifications may be made in the subject matter of the invention without departing from the spirit thereof, particularly as described in the following claims.

We claim:

1. A combination key device and an electrical receptacle for the key device wherein the receptacle defines electrical contact surface areas for mating with corresponding contact surface areas defined by the key device, at least one clip defining the electrical contact surface areas of said receptacle, a receptacle body for supporting said clip, an axially extending keyway opening defined by said body, said clip consisting of a one-piece electrical conductor and comprising a transverse portion and a pair of legs extending outwardly from the transverse portion, at least one contact element defined by each of said legs and extending inwardly toward said body, openings defined by said body and communicating with said keyway opening for receiving said contact elements, and a contact band carried by said key device, insertion of said key device into said keyway opening bringing said contact band into electrical contact with at least one of said contact elements, receipt of said contact elements in said openings serving to hold said clip in a stationary position relative to said receptacle body whereby said clip is prevented from movement axially upon said insertion of said key device.

2. A combination according to claim 1 wherein said contact elements comprise dimples formed integrally with said legs.

3. A combination according to claim 1 wherein a plurality of spaced-apart clips are supported by said body, and including a plurality of spaced-apart contact bands supported on said key-like device for contact with respective contact elements of said clips.

4. A combination according to claim 3 including saddle areas defined by said receptacle body for supporting said clips, and partition walls dividing the respective saddle areas.

5. A combination according to claim 1 including an outer housing receiving said body, said clip being retained between said housing and body, and including electrical connector means supported by said body.

6. A combination according to claim 5 including at least one contact ear defined by said clip, and means providing electrical connection between said ear and the electrical connector means supported by said body.

7. A combination according to claim 6 including a printed circuit board supported by said body, said printed circuit board providing the electrical connection between said ear and said connector.

8. A combination according to claim 7 mounted in association with an apparatus, the assembly of said receptacle and outer housing comprising a module adapted to alternatively be used in said apparatus, said apparatus including electrical operating elements, said connector being adapted for connection with said operating elements.

9. A combination according to claim 8 wherein said ear is attached to said printed circuit board, and wherein said connector comprises plug-in means for connection with said operating elements.

10. A combination according to claim 9 wherein said operating elements comprise a second printed circuit board, a microprocessor, and programming means whereby insertion of said key-like device into said receptacle serves as a means for utilizing said operating elements.

11. A combination according to claim 9 wherein said apparatus is used for vending goods or services.

12. A combination according to claim 9 wherein said apparatus is used in an outdoor environment.

13. A combination according to claim 12 wherein said apparatus comprises a parking meter.

14. A combination according to claim 1 wherein said key-like device includes electrical circuit means, said contact band serving as the means for connecting said electrical circuit means to said contact elements of said clips.

15. A combination according to claim 14 wherein said electrical circuit means comprises a printed circuit board, the circuit means including conductive areas exposed on opposite edges of said board, said contact band engaging said conductive areas.

16. A combination according to claim 15 wherein a plurality of spaced-apart clips are supported by said body, and including a plurality of spaced-apart contact bands supported on said key-like device for contact with respective contact elements of said clips, each band engaging respective sets of opposed contact elements.

17. A combination according to claim 1 wherein said key-like device defines a barrel of circular cross section, said band being circular and positioned in surrounding relationship with respect to said barrel whereby electrical contact between the band and the contact elements can be achieved in all positions of the device within the keyway opening.

18. A combination in accordance with claim 17 wherein the diameter of said contact band slightly exceeds the diameter of said barrel.

19. A combination according to claim 17 wherein said key-like device includes electrical circuit means, said contact band serving as the means for connecting said electrical circuit means to said contact elements of said clips.

20. A combination according to claim 19 wherein said electrical circuit means comprises a printed circuit board, the printed circuit board including conductive areas exposed on opposite edges of said board, said contact band engaging said conductive areas.

21. A combination according to claim 20 wherein said conductive areas connect to the same portion of said circuit means whereby electrical contact between any portion of said band and either of said conductive areas serves to connect the electrical circuit means of said key-like device with said receptacle.

22. A combination according to claim 21 wherein said apparatus is used for vending goods or services.

23. A combination according to claim 21 wherein said apparatus is used in an outdoor environment.

24. A combination according to claim 23 wherein said apparatus comprises a parking meter.

25. A combination key device and an electrical receptacle for the key device wherein the receptacle defines electrical contact surface areas for mating with contact surface areas defined by the key device, a keyway opening defined by said receptacle, said receptacle contact surface areas being exposed within said keyway opening, and a plurality of spaced apart contact bands carried by said key device providing the contact surface areas of said key device, insertion of said key device into said keyway opening bringing said contact bands into electrical contact with said receptacle contact surface areas, said key device comprising a substantially planar printed circuit board and conductive areas exposed on opposite edges of said board, said conductive areas comprising a plurality of separate conductive areas disposed along each edge of said board to provide a plurality of sets of opposed conductive areas, and wherein each of said contact bands is in contact with a different set of opposed conductive areas.

26. A combination according to claim 25 wherein said key-like device defines a barrel of circular cross section, said board having a length and width permitting location within the confines of the barrel, said band being circular and positioned in surrounding relationship with respect to said barrel whereby electrical contact between the band and the receptacle contact surface areas can be achieved in all positions of the device within the keyway opening.

27. A combination in accordance with claim 26 wherein the diameter of said contact band slightly exceeds the diameter of said barrel.

28. A combination according to claim 25 wherein said conductive areas connect to the same portion of the circuit carried by said printed circuit board whereby electrical contact between any portion of said band and either of said conductive areas serves to connect the circuit of said key-like device with said receptacle.

29. A combination according to claim 28 wherein said apparatus is used for vending goods or services.

30. A combination according to claim 28 wherein said apparatus is used in an outdoor environment.

31. A combination according to claim 30 wherein said apparatus comprises a parking meter.

* * * * *